United States Patent [19]

Fabre et al.

[11] Patent Number: 4,688,443
[45] Date of Patent: Aug. 25, 1987

[54] CONTROL DEVICE WITH TWO COUPLED CONTROL STICKS

[75] Inventors: Pierre Fabre; Didier Negre, both of Toulouse, France

[73] Assignee: Aerospatiale Societe Nationale Industrielle, Paris, France

[21] Appl. No.: 858,047

[22] Filed: May 1, 1986

[30] Foreign Application Priority Data

Jun. 7, 1985 [FR] France ................................ 85 08670

[51] Int. Cl.⁴ ............................................. G05G 9/10
[52] U.S. Cl. .................................. 74/469; 74/471 XY; 273/DIG. 28; 318/564
[58] Field of Search .................. 74/471 XY, 469; 244/234, 236, 230; 273/DIG. 28, 148 B, 85 G; 318/564, 591

[56] References Cited

U.S. PATENT DOCUMENTS

| | | | |
|---|---|---|---|
| 4,004,537 | 6/1977 | Nilsson | 244/236 X |
| 4,071,209 | 6/1978 | Hart | 244/236 X |
| 4,209,734 | 6/1980 | Osder | 318/564 |
| 4,283,964 | 8/1981 | Grattapaglia | 74/471 XY |
| 4,353,552 | 10/1982 | Pepper, Jr. | 273/856 |
| 4,389,048 | 6/1983 | Burgess | 273/DIG. 28 X |
| 4,588,187 | 5/1986 | Dell | 273/148 B X |
| 4,649,484 | 3/1987 | Herzog et al. | 244/230 X |

Primary Examiner—Cornelius J. Husar
Assistant Examiner—Joseph A. Fischetti
Attorney, Agent, or Firm—Fisher, Christen & Sabol

[57] ABSTRACT

In a device for controlling elements of a machine, comprising two control members of the joy stick type from one or other of which said elements may be controlled, these members being intended to be actuated by separate operators and each being mounted for tilting about at least one axis and connected to at least one sensor delivering an electric signal representative of the amplitude of tilt of the associated joy stick about said axis on each side of a neutral position, a signal processing system is provided receiving the signals from two sensors and delivering a single control reference addressed to said controlled elements of the machine.

14 Claims, 10 Drawing Figures

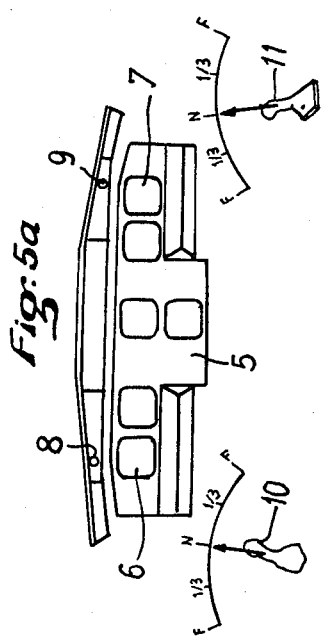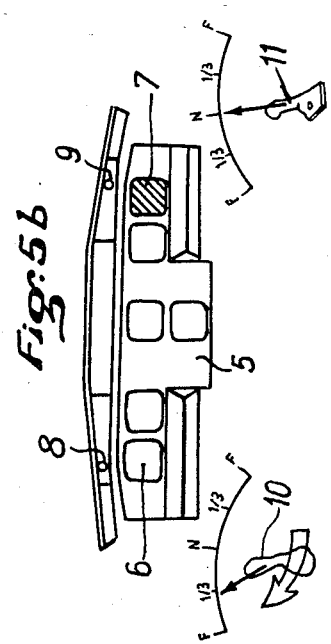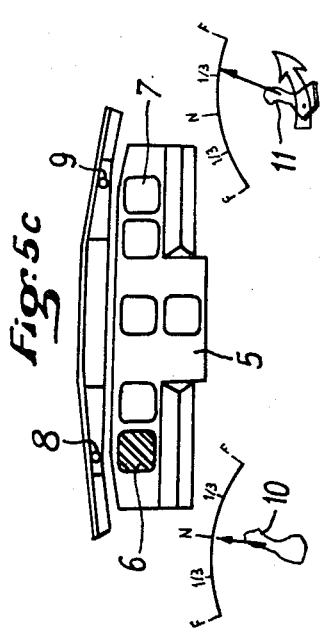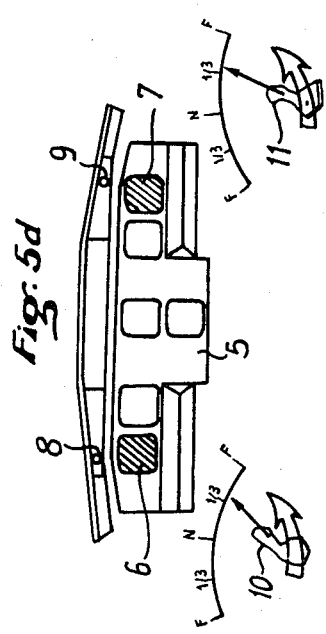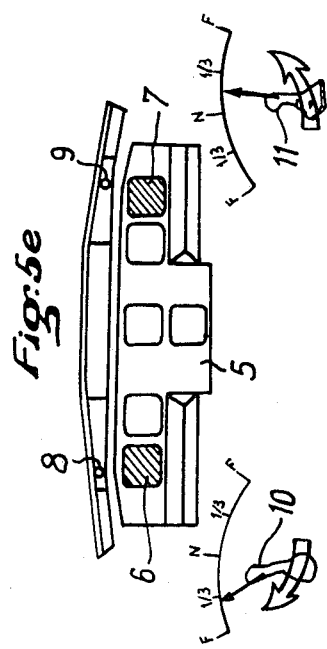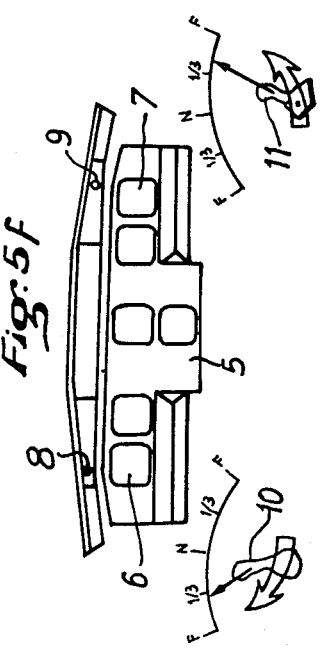

CONTROL DEVICE WITH TWO COUPLED CONTROL STICKS

BACKGROUND OF THE INVENTION

1. Field of the Invention

The present invention relates to a control device for a machine, having two coupled control sticks or joy sticks intended to be actuated by respective operators.

Although not exclusively, it applies more particularly to piloting devices for aircraft and it will be described hereafter more specially with reference to such an application, it being understood that this in no wise implies the limitation of the scope of the invention.

Numerous machines are known, such as aircraft, helicopters, tanks, public works machines, etc. . . , which are provided with an assembly of controlled elements which may be actuated from one or other of two interconnected control stations, controlled by two separate operators (called pilot and copilot in the case of vehicles) and each equipped with a control member of the joy stick type, mounted for pivoting in any direction. These two control members are connected to the members to be controlled and are mechanically coupled together so that each of said operators has at his disposal the whole of the controls for said members to be controlled and so that voluntarily tilting by direct actuation of one of said control members by one operator causes an identical induced tilting in the same direction or the other.

2. Description of the Prior Art

Up to present the transmission of control orders between a joy stick actuated by an operator and a member to be controlled has taken place mechanically, so that said joy sticks were of relatively large size and capable of withstanding and transmitting considerable mechanical forces. Such joy sticks were therefore adapted to be disposed in front of said operators, held with both hands by each operator and actuated through action of the forearm of this latter, the amplitude and intensity of the movements thereof being conditioned by the resistances to be overcome for operating the mechanical controls.

It will be noted that the use of both hands of each operator not only allowed considerable forces to be transmitted but also made these forces symmetrical and identical for both operators.

However, the mechanical controls are being more and more often replaced by electric controls having numerous advantages, for example in so far as the mass, the cumbersomeness, maintenance, and taking complex control laws into account, etc. . . are concerned. The result is that said joy sticks are connected and associated with electric sensors which detect the positional variations of said joy sticks and which control electric controls actuating said controlled members as a function of the indications from said sensors. Thus, said joy sticks only transmit very small forces and their size and mechanical strength may be considerably reduced. This has led to the design and use of small sized joy sticks called "ministicks", which may be held and actuated by a single hand of an operator.

In addition to the above mentioned advantages concerning the use of electric controls, such ministicks free the space in front of the operators, so as to optimize the grouping together of other controls in front of them, so that each ministick is disposed laterally with respect to said operators. In addition, particularly when the two control stations of the operators are parallel (which is generally the case in a vehicle in which said stations are disposed facing the front thereof), so as to respect the symmetry of the machine with respect to an axis passing between said stations, one of the ministicks is disposed on the left of the left hand operator and the other on the right of the right hand operator. In such a case, the left hand operator holds then the associated ministick in his left hand, whereas the right hand operator holds his in his right hand. Respect for the symmetry of control of the machine results then in asymmetry from the point of view of the operators.

It has been observed that such asymmetry raises difficulties, when the control of the machine requires tilting of the ministicks, laterally from left to right and conversely with respect to said operators. This certainly is due to human morphology which means that the possibilities of exerting a lateral force with the same hand holding a ministick are different depending on whether the force is exerted by pushing with the palm towards oneself or by pulling outwardly with the fingers. Moreover, in the above described arrangement, a pull with the fingers on one of the control sticks corresponds to a push with the palm in the other station.

Thus, not only will the lateral push and pull be felt differently by each operator, but furthermore the asymmetry of forces is reversed when a control with the left hand in the left hand station is taken up by a control with the right hand in the right hand station and vice versa. Passage of the control of the machine from one control post to the other does not then take place smoothly, which may result in serious consequences, particularly in the case of an aircraft.

To overcome these drawbacks, it has already been proposed, in a complex device for the mechanical interconnection of two ministicks, to associate a force sensing device with each of said control members, so that the force sensing device associated with the control member actuated by the left hand is active only when this latter is voluntarily and directly actuated by an operator from left to right, and so that the force sensing device associated with the control member actuated by a right hand is active only when this latter is voluntarily and directly actuated by an operator from right to left.

Such a device for the mechanical interconnection of two ministicks, having complex force sensing devices with selective action, gives satisfaction. However, because of its mechanical structure, it cannot take maximum advantage from the electrically controlled embodiment of the flight controls. In addition, it has considerable play and friction with respect to the range of movement obtained and to the forces brought into play, so that its performances, particularly in so far as piloting precision is concerned, are not as good as might be hoped for.

SUMMARY OF THE INVENTION

The object of the present invention is to overcome these drawbacks. It provides a control device comprising two mechanically independent joy sticks, for example (but not exclusively) ministicks, actuating in an interconnected way the elements for piloting a machine, particularly an aircraft, by means of electric sensors associated with electronic computing and logic means, more particularly with at least one electronic computer. The invention allows the maximum advantage to be taken of the electric flight controls, by providing better performances and greater piloting safety. In addition, because of the lack of mechanical coupling between the joy sticks, the above mentioned problems are solved concerning the reversal of the feeling of the forces exerted from one piloting station to the other.

The invention allows then the electric flight controls to be rationalized, equipped more particularly with lateral ministicks, in the piloting of aircraft, as well as the piloting conditions of the aircraft to be improved while at the same time ensuring safety, comfort and precision.

To this end, the invention provides a device for controlling elements of the machine, comprising two control members of the joy stick type from one or other of which said elements may be controlled, these members being actuated by separate operators and each being mounted for pivoting about at least one axis, and connected to at least one sensor delivering an electric signal representative of the tilt amplitude of said associated joystick about said axis on each side of a neutral position, which device further comprises a signal processing system receiving the signals from the two sensors and delivering a single control reference addressed to said elements of the machine.

Preferably, said single control reference is:

zero when the two joy sticks are in the neutral position;

equal to the signal corresponding to one joy stick moved away from its neutral position, when the other joy stick is in the neutral position;

equal to the sum of the signals of the two sensors when the two joy sticks are tilted in the same direction, this sum being limited to the maximum signal able to be emitted by a joy stick;

equal, when, with a first operator tilting his joy stick in one direction, the second operator tilts his in the opposite direction, but short of a travel threshold, to the difference between the signal emitted by the sensor associated with the first pilot and that emitted by the sensor associated with the second pilot and equal, when, with a first operator tilting his joy stick in one direction, the second operator tilts his in the opposite direction, beyond said travel threshold, to the difference between the signal emitted by the sensor associated with the second pilot and a fraction of that emitted by the sensor associated with the first pilot.

Thus:

when a single pilot is at the controls, it is his order which acts on said elements;

when the second pilot moves his joy stick in the same direction as the first or in the opposite direction, but short of said travel threshold, the two orders are summated algebraically;

the last pilot who goes beyond the travel threshold in the opposite direction to the first takes priority. This priority corresponds to a reduction of the authority of the non priority pilot to a fraction of his maximum authority.

Advantageously, when the joy stick of the second operator has been tilted in a direction opposite that of the first beyond said travel threshold, said single reference becomes the signal of the sensor associated with said first operator, as soon as the joy stick of the second operator comes back to the neutral position or as soon as the joy stick of said first operator passes again through the neutral position. Thus, a pilot may recover the whole of his authority as soon as the other pilot or himself has brought his joystick back to the neutral position.

So that each operator knows the order applied in actual fact to said controlled elements, display devices and/or indicator lights are provided for indicating to each of the operators the origin of the actual control reference. Consequently, each operator may know who is controlling the machine and how.

It has been discovered by experimentation that it was advantageous for the travel threshold to correspond to a third of the maximum travel and for said fraction of the signal of the first pilot to be equal to a third.

In the case when, for example aboard an aircraft, each joystick may tilt about two different axes and is associated with two sensors delivering respectively electric signals representative of the amplitude of the tilting of the joy stick about these two axes, each of the two tilting axes of a joy stick being associated with a tilting axis of the other stick, said signal processing system receives the signals from the four sensors and delivers two control references, each of which corresponds to tilting of said joy sticks about one of said axes.

Preferably, if one of the control references becomes equal to the difference between the signal emitted by a sensor associated with the second pilot who has tilted his joy stick and a fraction of that emitted by the corresponding sensor associated with the first pilot, the same goes for the other one of said references.

Thus, if one pilot loses priority with respect to a tilting axis, he also loses it for the other tilting axis.

Of course, the signal processing system comprises means for comparing the signals from said sensors with reference signals representative of characteristic values.

In the particular case of an aircraft, it is known to provide one or more control computers receiving all the parameters concerning the situation and the configuration of the aircraft, as well as the flight conditions. The signals from said sensors may then be also addressed to said computers.

From these two sets of data (coupling of the orders from the joy sticks and "situation" parameters of the aircraft) and taking into account the piloting laws stored in the computers, these latter permanently elaborate the orders for controlling the mobile surfaces used for piloting aircraft.

There corresponds then to a force exerted by a pilot on a joy stick, on the one hand, a movement and a piloting action, in accordance with the logic processing method of the invention, paired with that due to the force exerted by the other pilot on the other joy stick and, on the other hand, a feeling of force exerted proper to the controlled joy stick and to its direction of movement.

The constructional means used in the piloting system allows very good performances to be obtained particularly very low friction and no play and the different piloting members may thus be actuated from very low force thresholds allowing very good piloting precision to be obtained.

This piloting system using mechanically independent control members avoids any risk of jamming in the connections between two members.

It further allows several elements to be mounted in parallel thus providing reliability coefficients and safety conditions which are difficult to obtain with the means conventionally used.

BRIEF DESCRIPTION OF THE DRAWINGS

The Figures of the accompanying drawings will better show how the invention may be put into practice. In these Figures, identical references designate similar elements.

FIGS. 5a to 5f are for illustrating generally the operation of the control device of the invention.

DESCRIPTION OF THE PREFERRED EMBODIMENTS

Figure 1:
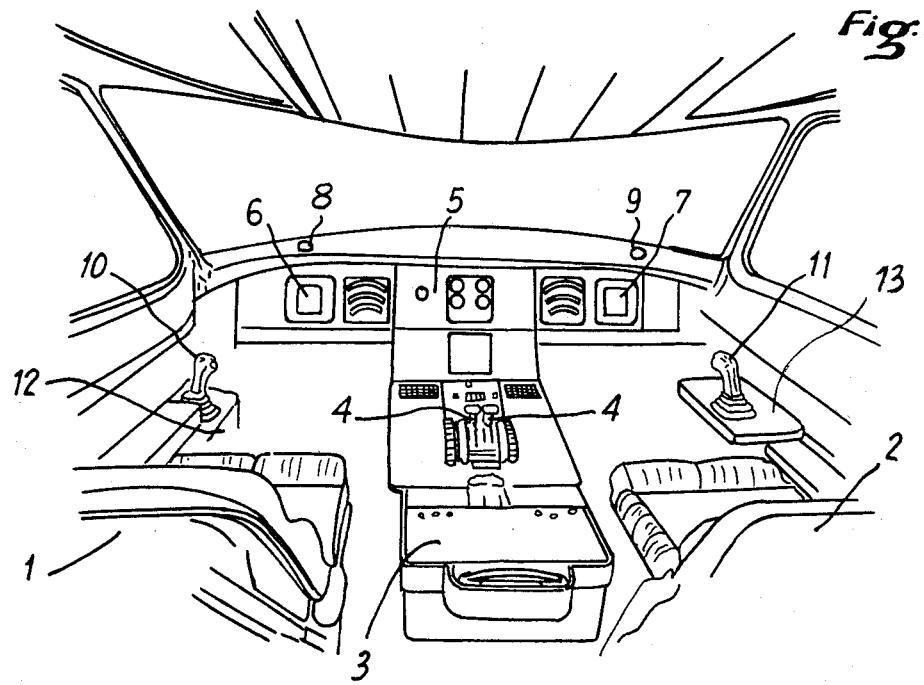
FIG. 1 is a partial perspective view, from the rear forwards, of a piloting station of a large civil transport aircraft equpped with lateral ministicks.

In FIG. 1 there is shown schematically and partially an axial perspective view from the rear to the front of the piloting station of a modern large civil transport aircraft, comprising a seat 1 for a pilot and a seat 2 for a copilot. Usually, the seat intended for the pilot is at the left, whereas that of the copilot is at the right.

The two piloting positions are separated from each other by a central console 3 having a plurality of control and regulation members, such as throttle control levers 4. Moreover, on the instrument panel 5 other monitoring means are provided, more particularly two display devices 6 and 7 and two indicator light 8 and 9, whose operation will be described hereafter, in connection with the operation of the control device of the invention. The display device 6 and the indicator light 8 are intended for the pilot and are disposed opposite his seat 1. On the other hand, display device 7 and indicator light 9 are meant for the copilot and are therefore disposed opposite his seat 2.

It will be noted that, in the piloting station shown in FIG. 1, the two usual joy sticks disposed in front of the pilot and the copilot, respectively, and intended to be held and operated with both hands, have been omitted. These usual joy sticks, of a large size, have been replaced by simple pivoting handles 10 and 11, disposed respectively on the left of the pilot and on the right of the copilot; thus, handle 10 is intended to be actuated by the left hand of the pilot and handle 11 by the right hand of the copilot. For example (see also FIGS. 2 and 3), the aircraft is controlled in depth by tilting handle 10, or handle 11, parallel to the longitudinal median plane of the aircraft about a transverse axis X—X and for rolling by tilting one of said handles laterally, transversely to said longitudinal median plane, about a longitudinal axis Y—Y. As will be seen further on, each handle may, from a neutral position N, be tilted forwards (arrow FAV), rearwards (arrow FAR), towards the right (arrow FD) and towards the left (arrow FG).

Handles 10 and 11 are called "ministicks" and in accordance with the invention are electrically coupled so that the aircraft may be piloted from one or other of them or from both.

Figure 2:
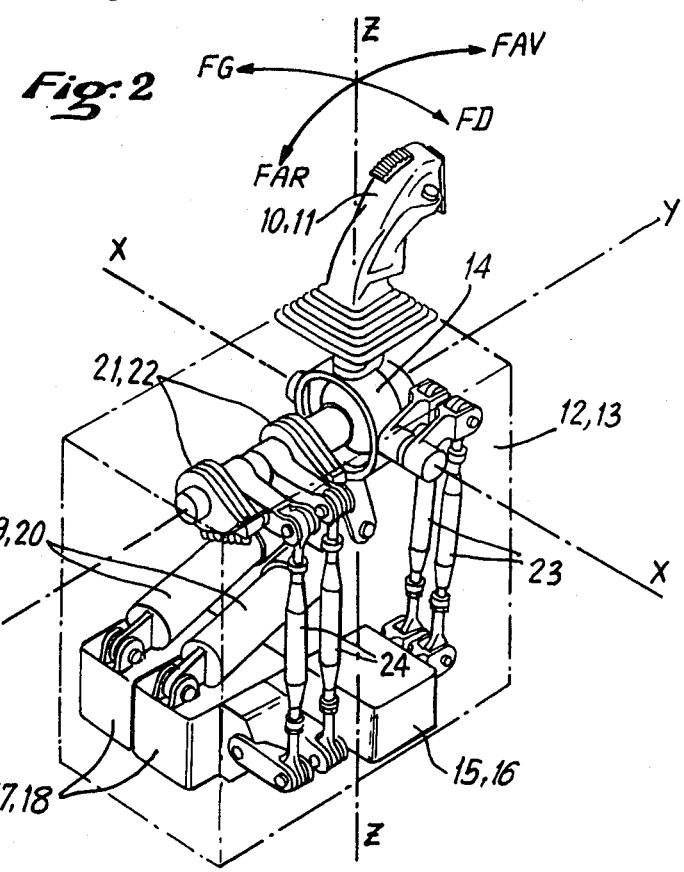
FIG. 2 shows schematically the assembly of a ministick and its sensors, provided in the piloting station of FIG. 1.
Figure 3:
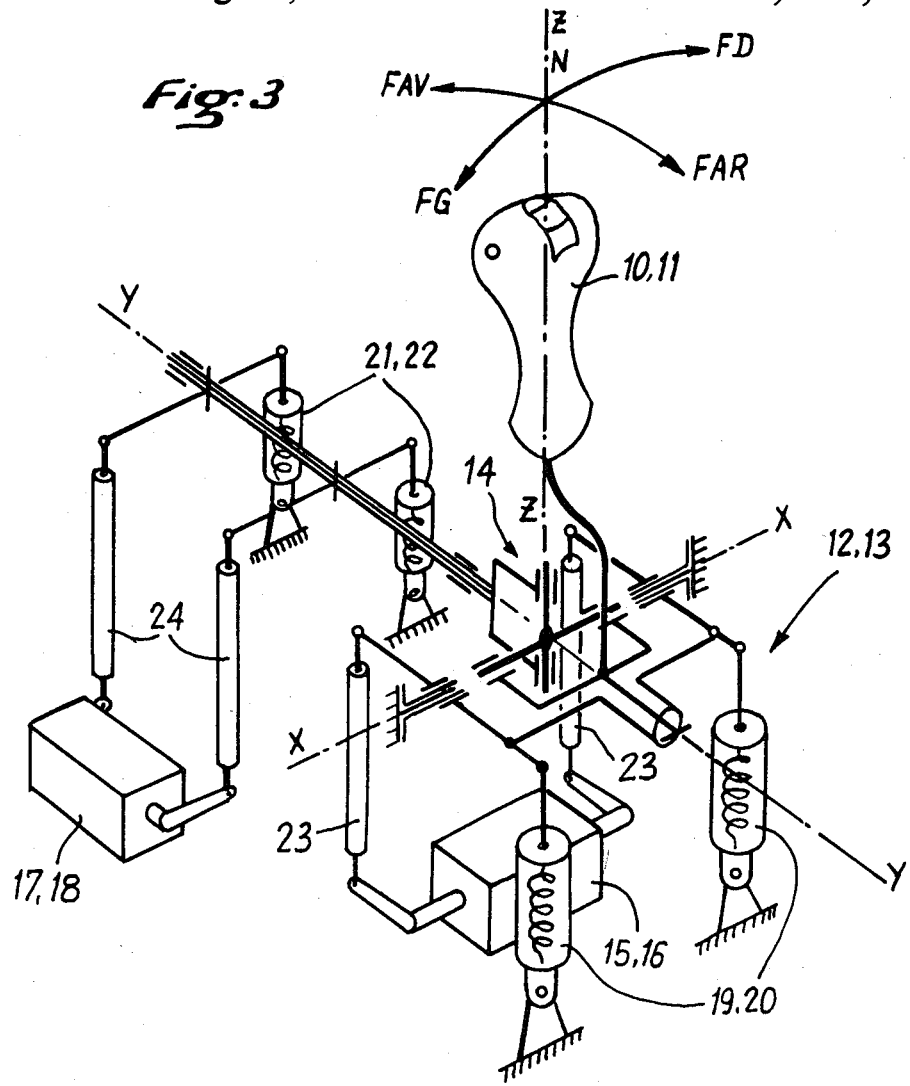
FIG. 3 shows the functional diagram of the assembly of a ministick and its sensors, shown in FIG. 2, FIG. 4 gives the block diagram of the control device of the invention.

As shown in FIGS. 2 and 3, each handle 10 and 11 is associated with a mechanism 12 and 13 respectively, comprising a joint, for example a ball and socket joint or a universal joint 14, allowing it to be tilted about the transverse axis X—X and about the longitudinal axis Y—Y. Mechanisms 12 and 13 further comprise each one a depth sensor 15 or 16, a roll sensor 17 or 18, a depth force sensing device 19 or 20 and a roll force sensing device 21 or 22 (in these FIG.s, each device 19, 20, 21 and 22 is double).

Thus, when handle 10 is actuated by the pilot so that its axis Z—Z is moved out of its neutral position N, any tilting about the axis X—X is transmitted, for example by links 23, to the depth sensor 15, which delivers a representative depth signal VCPQ, whereas any tilting about the axis Y—Y is transmitted, for example by links 24, to the role sensor 71, which delivers a representative roll signal VCPP.

Similarly, when handle 11 is actuated by the copilot so that its axis Z—Z is moved out of its neutral position N, any tilting about axis X—X is transmitted, by the corresponding links 23, to the associated depth sensor 16, which delivers a representative depth signal VFOQ, whereas any tilting about axis Y—Y is transmitted, through the corresponding links 24, to the roll sensor 18 which delivers a representative roll signal VFOP.

The force sensing devices 19 to 22, for example springs, introduce a certain resistance to the voluntary tilting of handles 10 and 11 and bring them back to the neutral position N, when they are released by the pilot or the copilot.

Thus, each mechanism 12 and 13, in relation with the tilting of the associated handle 10 or 11, is able to emit a depth signal, VCPQ or VFOQ respectively, and a roll signal, VCPP or VFOP respectively.

Figure 4:
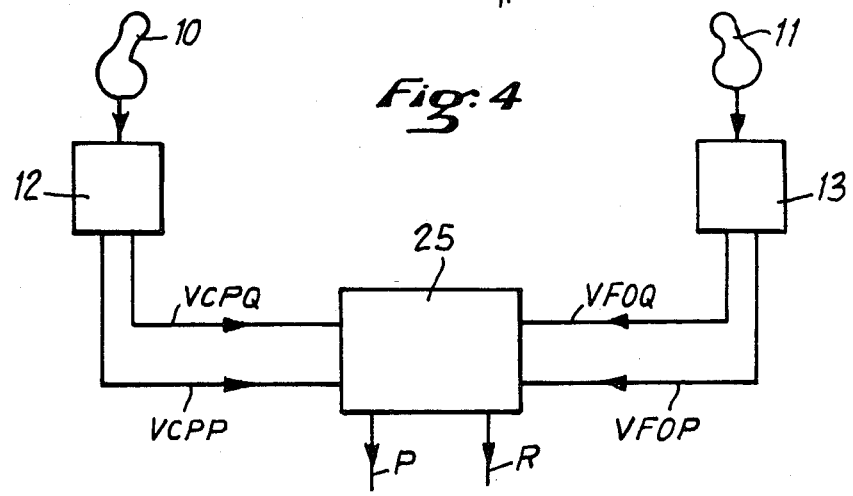

As shown schematically in FIG. 4, the control device of the invention comprises a system 25 for processing the control orders, which receives the signals VCPQ, VCFOQ, VCPP and VFOP resulting from the movement of one and/or other of handles 10 and 11 and which combines these signals for generating at its outputs a single depth reference P and a single roll reference R. These references P and R are then addressed to the corresponding members (not shown) of the aircraft, preferably through a control computer.

Processing of the control orders, provided by system 25, may vary depending on the type of aircraft or the control systems used. By way of example, an order coupling system is described hereafter with reference to a medium size transport aircraft.

The coupling of the orders, as well as the information given to the pilot or to the copilot concerning the results of the logic of processing the orders are, in this particular case, summed up hereafter:

(1) When a single operator (pilot or copilot) is at the controls, his orders are fed to the control computer and a characteristic indication appears on the display device 6 or 7 of the other operator;

(2) When, with one operator at the controls, the other operator moves his stick 10 or 11 in the same direction as the first one or in the opposite direction, but short of one third of the total range of said stick, the two orders are summed algebraically. Furthermore, a characteristic indication appears on the two display devices 6 and 7

(3) When the two operators are at the controls, the last one who causes his stick 10 or 11 to travel beyond a third of the range in the direction opposite the first one takes priority. This priority corresponds to a reduction of the authority of the non-priority pilot to a third of his maximum authority, for both axes X—X and Y—Y. A characteristic indication appears on the indicator light 8 or 9 of the non priority operator.

The non-priority operator recovers the whole of his authority as soon as the other pilot or himself has brought his stick back to neutral.

The normal associated procedure is that the pilot who intervenes informs the other pilot. The action of the other pilot on this announcement or on seeing the indications displayed at 6 to 9 is to release the stick.

This coupling logic is the result of theoretical studies, security analyses and long experimentation on simululators.

The experimentation was carried out by numerous pilots having different experience. This coupling logic ensures the coordination and security functions which the controls must fulfill in all configurations of the aircraft and in all flight phases, in all normal or exceptional situational cases of the aircraft or pilots. This coupling logic readily allows one or other pilot to take over.

The operation which has just been described of the control signal processing system 25 is illustrated hereafter with reference to FIGS. 5a to 5f, in so far as tilting of handles 10 and 11 about axis Y—Y is concerned, that is to say rolling control. Identical FIG.s could illustrate the depth control (tilting of handles 10 and 11 about axis X—X).

These FIGS. 5a to 5f illustrate a number of configurations:

(a) in FIG. 5a, the two handles 10 and 11 are in the neutral position N. It follows that signals VCPP and VFOP are zero and that the signal R at the output of the system 25 is also zero; no indication appears either on the display devices 6 and 7, or on the indicator lights 8 and 9;

(b) in FIG. 5b, the pilot is at the controls and he tilts his handle 10, so that the sensor 17 of mechanism 12 emits a roll signal VCPP. On the other hand, the handle 11 of the copilot is in the neutral position. In this case, the roll signal R delivered by system 25 is formed by the signal VCPP and an indication appears on the display device 7 associated with the copilot, indicating to this latter that the pilot is at the controls;

(c) in FIG. 5c, the copilot is at the controls and his handle 11 has been tilted, so that the sensor 18 of mechanism 13 emits a roll signal VFOP. On the other hand, the handle 10 of the pilot is in the neutral position. In this case, the roll signal R delivered by system 25 is formed by the signal VFOP and an indication appears on the display device 6 associated with the pilot, indicating to this latter that the copilot is at the controls;

(d) in FIG. 5d, the pilot is at the controls and his handle 10 has been tilted, so that the sensor 17 of mechanism 12 emits a roll signal VCPP. In addition, the copilot tilts his handle 11, in the same direction as that of handle 10, so that the sensor 18 of mechanism 13 emits a roll signal VFOP of the same sign as that of the signal VCPP. In this case, the roll signal R delivered by system 25 is formed by the sum of the signals VCPP+VFOP, this sum being however limited to the maximum roll control signal associated with the maximum range of movement of each of handles 10 and 11; furthermore, indications appear on the two display devices 6 and 7 informing the pilot the the copilot of the simultaneous control configuration;

(e) of course, FIG. 5d illustrates similarly the case where, the copilot at the controls, the pilot tilts handle 10 in the same direction as that in which the handle 11 has already been tilted by the copilot;

(f) in FIG. 5e, the pilot is at the controls and his handle 10 has been tilted, so that sensor 17 of mechanism 12 emits a roll signal VCPP. The copilot then tilts his handle 11, in the direction opposite that of handle 10, but the amplitude of the tilt of said handle 11 is less than a third of the possible total range of movement. Sensor 18 of mechanism 13 then emits a roll signal VFOP of a sign opposite that of signal VCPP. In this case, the roll signal R delivered by system 25 is the difference (or algebraic sum) VCPP−VFOP and indications appear on the two display devices 6 and 7, for apprising the pilot and copilot of the situation;

(g) with the copilot at the controls, if the pilot tilted his handle 10 in the direction opposite that of handle 11, with a range of movement less than a third of the total range, the roll signal R would be equal to VFOP−VCPP. This situation is not illustrated in the FIG.s, but is symmetrical with that shown in FIG. 5e and can be immediately deduced therefrom;

(h) in FIG. 5f, the pilot is at the controls and his handle 10 has been tilted, so that sensor 17 of mechanism 12 emits a roll signal VCPP. The copilot then tilts his handle 11, in the directiion opposite that of handle 10, the amplitude of the tilting of said handle 11 being greater than a third of the total possible range of movement. Sensor 18 of mechanism 13 then emits a roll signal VFOP of a sign opposite that of VCPP. System 25 detects that the copilot has just caused his handle 11 to go beyond the position corresponding to a third of the travel and gives priority of control to the copilot. For that, it reduces the authority of the pilot to a third of his maximum authority. System 25 emits then a signal R equal to the difference VFOP−(VCCP)/3. In addition, the indicator light 8 lights up for informing the pilot of his loss of authority;

(i) with the copilot at the controls, if the pilot tilted his handle 10 in the direction opposite that of handle 11, with a range of movement greater than a third of the total range, the roll signal R would be equal to VCPP−(VFOP)/3 and the indicator light 9 would light up for informing the copilot that the pilot has taken priority. This situation is not illustrated in the Figures, but is symmetrical with that shown in FIG. 5f and may be immediately deduced therefrom;

(j) when, in conformity with what has been said in paragraphs (h) and (i) above, the pilot or the copilot loses roll control priority, he also looses automatically depth control priority under the action of system 25 so that the signal P is equal either to VFOQ−(VCPQ)/3 or to VCPQ−(VFOQ)/3.

Similarly, if the pilot or copilot lost the depth control priority, he would also lose roll control priority.

(k) the operator (pilot or copilot) who, under the action of system 25 and under the conditions explained in paragraphs (h), (i) and (j) above, has lost priority, recovers the whole of his authority as soon as the other operator or himself brings his handle 10 or 11 back to the neutral position.

What is claimed is:

1. A device for controlling elements of a machine which is capable of control by two pilots, comprising:
   two control members of the joy stick type, from one or other of which said elements can be controlled, these members being intended to be actuated by separate pilots, and each being mounted for tilting about at least one axis;
   sensors connected to said control members and each delivering an electric signal representative of the amplitude of tilt of the associated joy stick about said axis on each side of a neutral position;

a signal processing system receiving these signals from said sensors and delivering a single control reference to said controlled elements of the machine;

said signal processing system including comparator means for comparing said signals from the sensors with reference signals, in such a way that said single control reference is:

zero when the two joy sticks are in the neutral position;

equal to the signal corresponding to a joy stick moved away from its neutral position when the other joy stick is in the neutral position;

equal to the sum of the signals of the two sensors when the tilting of the two joy sticks is in the same direction, this sum being limited to the maximum signal able to be emitted by each separate joy stick;

equal when, with a first pilot having tilted his joy stick in one direction, the second pilot tilts his joy stick in the oposite direction but short of a travel threshold, to the difference between the signal emitted by the sensor associated with the first pilot and that emitted by the sensor associated with the second pilot; and equal to the difference between the signal emitted by the sensor associated with the second pilot and a fraction of that emitted by the sensor associated with the first pilot when, with a first pilot having tilted his joy stick in one direction, the second pilot tilts his joy stick in the opposite direction beyond said travel threshold.

2. The device as claimed in claim 1, wherein when the joy stick of the second pilot has been tilted in a direction opposite that of the first beyond said travel threshold, said single reference becomes the signal of the sensor associated with said first pilot, as soon as the joy stick of the second pilot comes back to the neutral position or as soon as the joy stick of said first pilot comes back through the neutral position.

3. The device as claimed in claim 1, wherein at least one of display and indicator devices are provided for indicating to each of the pilots the origin of the actual control reference.

4. The device as claimed in claim 1, wherein the travel threshold corresponds to a third of the maximum travel.

5. The device as claimed in claim 1, wherein said fraction of the signal of the first pilot is equal to a third.

6. The device as claimed in one of claims 1 or 2 to 5, in which each joy stick can tilt about two different axes and is associated with two sensors, delivering respectively electric signals representative of the amplitude of tilt of said joy stick about these axes, each of the two tilt axes of a joy stick being associated with a tilt axis of the other joy stick, wherein said signal processing system receives the signals from the four sensors and delivers two control references, each of which corresponds to the tilting of said joy sticks about one of said axes.

7. The device as claimed in claim 6, wherein, if one of the control references becomes equal to the difference between the signal emitted by a sensor associated with the second pilot who has tilted his joy stick and a fraction of that emitted by the corresponding sensor associated with the first pilot, the same goes for the other of said references.

8. The device as claimed in claim 7, wherein the machine is an aircraft.

9. The device as claimed in one of claims 1 or 2 to 5, wherein the machine is an aircraft.

10. A method for controlling elements of a machine which is capable of control by two pilots, comprising operating a device for controlling elements of the machine, said device having:

two control members of the joy stick type, from one or other of which said elements can be controlled, these members being intended to be actuated by separate pilots and each being mounted for tilting about at least one axis;

sensors connected to said control members and each delivering an electric signal representative of the amplitude of tilt of the associated joy stick about said axis on each side of a neutral position;

a signal processing system receiving these signals from said sensors and deliverying a single control reference to said controlled elements of the machine;

said signal processing system including comparator means for comparing said signals from the sensors with reference signals, in such a way that said single control reference is:

zero when the two joy sticks are in the neutral position;

equal to the signal corresponding to a joy stick moved away from its neutral position when the other joy stick is in the neutral position;

equal to the sum of the signals of the two sensors when the tilting of the two joy sticks is in the same direction, this sum being limited to the maximum signal able to be emitted by each separate joy stick;

equal when, with a first pilot having tilted his joy stick in one direction, the second pilot tilts his joy stick in the opposite direction but short of a travel threshold, to the difference between the signal emitted by the sensor associated with the first pilot and that emitted by the sensor associated with the second pilot, and equal to the difference between the signal emitted by the sensor associated with the second pilot and a fraction of that emitted by the sensor associated with the first pilot when, with a first pilot having tilted his joy stick in one direction, the second pilot tilts his joy stick in the opposite direction beyond said travel threshold, said method being carried out under conditions whereby elements of the machine are controlled.

11. The method as claimed in claim 10, wherein when the joy stick of the second pilot has been tilted in a direction opposite the joy stick of the first pilot and beyond said travel threshold, said single reference becomes the signal of the sensor associated with said first pilot, as soon as the joy stick of the second pilot comes back to the neutral position or as soon as the joy stick of said first pilot comes back through the neutral position and wherein at least one of display and indicator devices are provided for indicating to each of the pilots the origin of the actual control reference.

12. The method as claimed in claim 10, wherein the travel threshold corresponds to a third of the maximum travel and wherein said fraction of the signal of the first pilot is equal to a third.

13. The method as claimed in claim 10, wherein each joy stick can tilt about two different axes and is associated with two sensors, delivering respectively electric signals representative of the amplitude of tilt of said joy stick about these axes, each of the two tilt axes of a joy stick being associated with a tilt axis of the other joy stick, wherein said signal processing system receives the signals from the four sensors and delivers two control references, each of which corresponds to the tilting of said joy sticks about one of said axes, and wherein, if one of the control references becomes equal to the difference between the signal emitted by a sensor associated with the second pilot who has tilted his joy stick and a fraction of that emitted by the corresponding sensor associated with the first pilot, the same goes for the other of said references.

14. The method as claimed in claim 10, wherein the machine is an aircraft.

* * * * *